United States Patent [19]

Okada et al.

[11] Patent Number: 4,666,030
[45] Date of Patent: May 19, 1987

[54] APPARATUS FOR ARRAYING AND CONVEYING WEB-LIKE MATERIAL

[75] Inventors: Noboru Okada, Kanagawa; Toshio Tanaka, Hiratsuka, both of Japan

[73] Assignee: The Yokohama Rubber Co., Ltd., Tokyo, Japan

[21] Appl. No.: 726,699

[22] Filed: Apr. 24, 1985

[30] Foreign Application Priority Data

Apr. 25, 1984 [JP] Japan .................. 59-81900

[51] Int. Cl.⁴ .................................. B65G 47/26
[52] U.S. Cl. .................... 198/431; 198/457
[58] Field of Search ............ 198/457, 434, 431, 614, 198/430, 429

[56] References Cited

U.S. PATENT DOCUMENTS

| | | | |
|---|---|---|---|
| 1,156,721 | 10/1915 | Strunk | 198/431 X |
| 1,911,093 | 5/1933 | Shackelford | 198/429 |
| 2,401,592 | 6/1946 | Stocker | 198/431 |
| 4,256,222 | 3/1981 | Gunti | 198/457 |

Primary Examiner—Joseph E. Valenza
Assistant Examiner—D. Glenn Dayoan
Attorney, Agent, or Firm—Finnegan, Henderson, Farabow, Garrett & Dunner

[57] ABSTRACT

Apparatus for arraying/conveying web-like workpieces such as unvulcanized treads delivered from an extruder. A plurality of forks sequentially lift the workpieces to and from roller conveyors and arrange the workpieces in selected uniform spaced-apart relation on a flat storage area.

5 Claims, 32 Drawing Figures

APPARATUS FOR ARRAYING AND CONVEYING WEB-LIKE MATERIAL

BACKGROUND OF THE INVENTION

1. Field of the Invention:

The present invention relates to an apparatus for arraying/conveying web-like works such as unvulcanized tread cut in an extruder line into segments of a predetermined length and, more particularly, to an arraying/conveying apparatus which forms, just before the web-like works are transferred to and arrayed on storage pallets, the array of the web-like work to be formed on the pallets in advance of the transfer.

Figure 1:
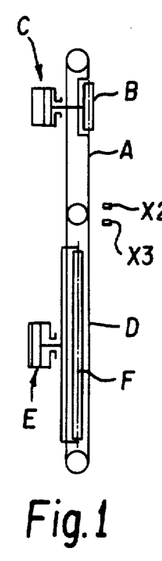
FIGS. 1 and 2 are a side elevational view and a plan view of a conventional arraying/conveying apparatus.
Figure 2:
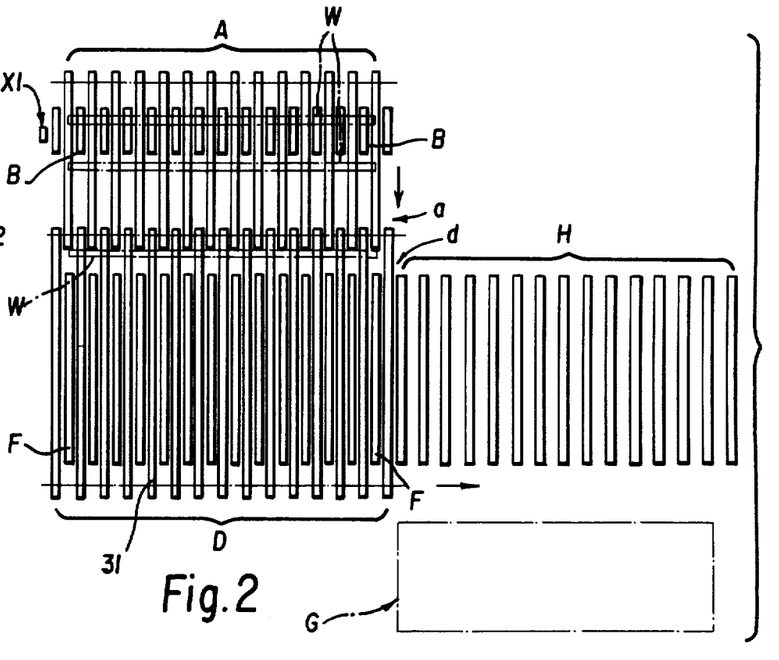

2. Description of the Prior Art:

FIGS. 1 and 2 show a typical conventional apparatus of the kind described. This apparatus has a multi-belt conveyor A (or a multi-chain conveyor) and a feed roller conveyor B which has conveyor rollers arranged between adjacent belts or chains of the conveyor A and arranged orthogonally to the conveyor A, the feed roller conveyor B being adapted to feed web-like works W such as unvulcanized tread which have been cut into a predetermined length and conveyed from a tread extrusion line which is not shown. The feed roller conveyor B is designed to be moved above and below the surface of the multi-belt conveyor A by means of a lifting cylinder C. An arraying multi-belt conveyor D is disposed at the outlet end a of the multi-belt conveyor A such that the belts of the belt conveyor D partially laps the outlet end a or extend in parallel with the same. A shifting roller conveyor F is arranged orthogonally to the arraying multi-belt conveyor D such as to be moved above and below the surface of the arraying multi-belt conveyor D by the operation of a lifting cylinder E. A receiving conveyor H adapted to receive the web-like works W arrayed and transferred by the arraying multi-belt conveyor D is disposed at the outlet end d of the latter.

In operation, the feed roller conveyor B is lifted and stationed above the multi-belt conveyor A and conveys the web-like work W cut and delivered from the tread extrusion line to a predetermined position. The arrival of the web-like work W at the predetermined position is detected by a detecting means X1 such as a photocell which operates to stop the feed roller conveyor B. At the same time, the lifting cylinder C is operated to lower the feed roller conveyor B below the surface of the multi-belt conveyor A so that the web-like work W is transferred from the feed roller conveyor B onto the multi-belt conveyor A. Then, the multi-belt conveyor A is started and when the end (leading side edge as viewed in the direction of movement) is detected by a detecting means X2 such as a photocell, the arraying belt conveyor D is started so that the web-like work W is moved onto the arraying conveyor D. When the trailing end of the web-like work W, i.e., the side edge adjacent the feed roller conveyor B, has passed the detecting means X3, the arraying multi-belt conveyor D is stopped.

In the described manner, the feed roller conveyor B is lifted again by the lifting cylinder C to the level above the multi-belt conveyor A, such as to wait for the next web-like work W. Then, as explained before, the feed roller conveyor B is stopped when the web-like work W has reached a predetermined position on the feed roller conveyor B and is lowered to the level below the surface of the multi-belt conveyor A thus transferring the web-like work W onto the multi-belt conveyor A. Then, the multi-belt conveyor A is started and, when the leading end of the web-like work W is detected by the detecting means X2, the arraying multi-belt conveyor D is started, so that the new web-like work W is positioned on the arraying multi-belt conveyor D at a predetermined pitch or distance from the preceding material W. The arraying multi-belt conveyor D is stopped when the trailing end, i.e., the end adjacent the feed roller conveyor B, has passed the position of the detecting means X3. Thus, the web-like works W are arrayed on the arraying multi-belt conveyor D at a pitch which corresponds to the time interval between the detection by the detecting means X2 and the detection by the detecting means X3.

The operation described hereinabove is repeated until a predetermined number of web-like works W are arrayed on the arraying multi-belt conveyor D at a predetermined pitch.

Then, the lifting cylinder E is operated to raise the shifting roller conveyor F above the surface of the arraying multi-belt conveyor D so that the web-like works arrayed on the multi-belt conveyor D are transferred to the shifting roller conveyor F. Then, the shifting roller conveyor F and the receiving conveyor H are driven so that the web-like works W are moved to the receiving conveyor H arranged at the outlet end d of the arraying multi-belt conveyor D. The receiving conveyor H then transfers the array of web-like works W onto the storage pallets G.

This operation is made repeatedly so that successive arrays of the web-like work W are formed on the arraying multi-belt conveyor D and forwarded to the next step of process.

This known apparatus suffers from the following problems.

Namely, the transfer of the preceding web-like work W to the arraying multi-belt conveyor D has to be finished until the subsequent web-like work W reaches the inlet side of the feed roller conveyor B. In addition, the feed roller conveyor B has to be raised by this time. Therefore, the time length for the convey by the multi-belt conveyor A is limited so that the speed of this conveyor A has to be high. In consequence, the web-like work W tends to slip on the surface of the multi-belt conveyor A when the latter is started and stopped. In addition, it is quite difficult to eliminate or uniformalize the amounts of slip between respective belts and the associated pulleys in the multi-belt conveyor A. In consequence, it is often experienced that the web-like work W runs obliquely or turned during the convey.

In the case where the web-like work W is an unvulcanized tread or the like work, the oblique running or turning of the material tends to cause a mutual contact or lapping of successive materials W, resulting in adhesion thereof to make the materials W unusable. Hitherto, therefore, it has been necessary to preserve a large gap between successive treads taking into account the oblique running and turning. This in turn increases the pitch of array of the web-like works W so that the number of materials W carried by one storage pallet G is reduced undesirably.

In addition, since the web-like works W are often stored in the storage pallet G in the oblique or turned posture, the quality of the product is impaired disadvantageously.

SUMMARY OF THE INVENTION

Object of the Invention

Accordingly, an object of the invention is to provide an arraying and conveying apparatus for web-like works, capable of minimizing the oblique running or turning of web-like works during arraying, thereby allowing a small and constant pitch of the web-like works forming to array.

Brief Summary of the Invention

To this end, according to the invention, there is provided an apparatus for arraying/conveying web-like works comprising: a feeding means 20 for feeding web-like works W cut in a predetermined size; an arraying-/conveying means 30 disposed in the vicinity of the feeding means; and shifting means 100 disposed between the feeding means and the arraying/conveying means and having a fork movable up and down and forward and backward such as to shift the web-like works from the feeding means to the arraying/conveying means at a predetermined pitch.

More specifically, the feeding means 20 and the arraying/conveying means 30 are arranged in parallel with the direction of convey of the web-like works W and in a side-by-side fashion. The arraying/conveying means is disposed along side the feeding means as viewed in the direction of the convey.

The web-like works formed into desired shape are conveyed and moved onto the feeding means, and are then shifted by the shifting means 100 onto the arraying-/conveying means which inturn forward the web-like works toward the next step of the process.

In order to make an efficient use of the apparatus of the invention, the web-like works are placed one by one on the feeding means and are shifted by the shifting means successively onto the arraying/conveying means while the latter is stopped. The arraying and shifting means is designed such that it can carry a plurality of web-like works at a time, and the shifting means shifts the web-like works to form an array on the arraying-/conveying means.

The feeding means and the arraying/conveying means may be composed of plurality of rollers arranged in parallel and orthogonally to the direction of the convey.

The shifting means has a plurality of forks 117 which are extended along the rollers of the feeding means and the arraying/conveying means. These forks are positioned between adjacent rollers. Therefore, the rollers of the feeding means and the rollers of the arraying-/conveying means have to be arranged such as to correspond to each other. The forks are movable up and down and forward and backward by a power source and a power transmission which are mounted in the apparatus.

The above and other objects, features and advantages of the invention will become clear from the following description of the preferred embodiments when the same are read in conjunction with the accompanying drawings.

BRIEF DESCRIPTION OF THE DRAWINGS

FIGS. 9($a$) to 9($o$), 9($a$-1), 9($d$-1), 9($e$-1), 9($h$-1), 9($i$-1), 9($l$-1), 9($m$-1), 9($n$-1) and 9($0$-1) are illustrations of operation of the apparatus in accordance with the invention.

DESCRIPTION OF THE PREFERRED EMBODIMENT

A preferred embodiment of the invention will be explained hereinunder with reference to FIGS. 3 to 9.

In the following description, the same reference numerals are used to denote the same constituents as those of the conventional arrangement explained before in connection with FIGS. 1 and 2, and detailed description of such parts are omitted.

Figure 3:
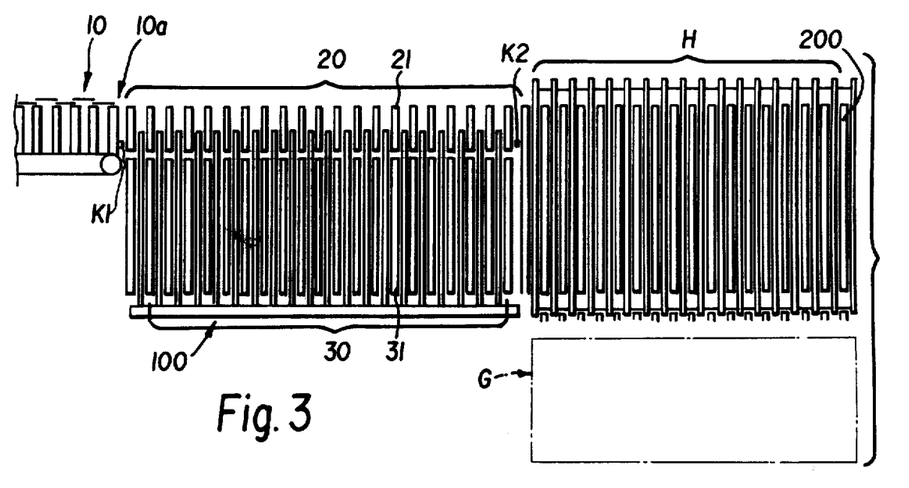
FIG. 3 is a plan view of an arraying/conveying apparatus carrying out the present invention.

FIG. 3 is a schematic plan view of an arraying/conveying apparatus embodying the invention. The apparatus has a locating conveyor 10 adapted to locate and convey web-like works W such as unvulcanized treads cut into a predetermined side by an extrusion line which is not shown, a feed roller conveyor 20 constituting a feeding means and arranged adjacent the outlet portion 10$a$ of the locating conveyor 10, an arraying/conveying roller conveyor 30 constituting the arraying/conveying means, a receiving conveyor H connected to the arraying/conveying conveyor 30, a shifting means 100 disposed between the feeding means 20 and the arraying/conveying means 30, and a shifting belt conveyor 200 disposed between adjacent belts of the receiving conveyor H.

A symbol K1 designates a detecting means such as a photocell for stopping the web-like work W at a predetermined position on the feeding means 20, while K2 designates a detecting means such as a photocell adapted for detecting that the shifting of array of the web-like works W from the feeding means 20 and the arraying/conveying means 30 to the receiving conveyor H has been completed.

A symbol G represents a storage pallet for carrying the array of the web-like works W transferred from the shifting belt conveyor 200.

Figure 4:
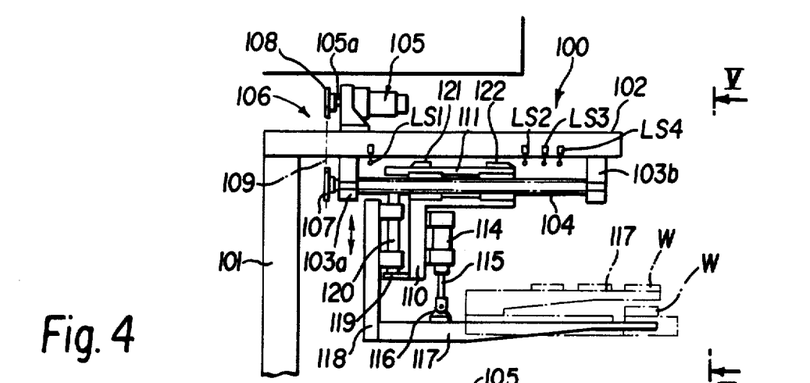
FIG. 4 is an enlarged front elevational view of a shifting means.
Figure 5:
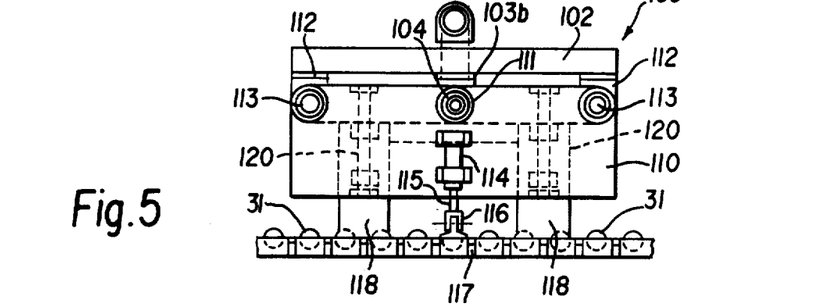
FIG. 5 is a side elevational view as viewed in the direction of the arrow V—V of FIG. 4.

As shown in FIGS. 4 and 5, the shifting means 100 has a supporting frame 101 standing upright at one side of the arraying/conveying means 30 in the direction of the convey of the web-like works W shown by an arrow in FIG. 3. The supporting frame 101 carry at the top thereof a guide frame 102 extending in parallel with the direction of the convey.

A ball screw 104 is rotatably mounted on the center of the lower side of the guide frame 102 through the intermediaries of bearings 103$a$ and 103$b$. The ball screw 104 is designed to be driven by a driving motor 105 on the guide frame 102 through a power transmission 106.

The transmission mechanism 106 includes a sprocket 107 attached to one end of the ball screw 104, a sprocket 108 provided on the output shaft 105$a$ of the driving motor 105, and a chain 109 going round these sprockets such as to transmit power therebetween.

A ball nut 111 supporting a slide block 110 is slidably screwed to the ball screw 104. At the same time, a slide shaft 113 secured to the lower side of each end of the guide frame 102 through a bracket 112 is slidably supported on each end of the slide block 110. A lifting cylinder 114 is fixed to one side of the slide block 110. The lifting cylinder 114 has a piston rod 115 the end of which is connected through a connector 116 horizontally to the center of a supporting frame 118 which carries a plurality of forks 117. The forks 117 are arranged between adjacent rollers 31 of the arraying/conveying means 30, such that they are moved above and below the surface of the rollers 31 by the action of the lifting cylinder 14.

The forks 117 are guided at their rear ends by a guide 120 which is secured to a side surface of the slide block 110 through a frame guide 119. Therefore, by arranging such that the driving motor 105 and the lifting cylinder 114 operate in relation to each other, the forks 117 move reciprocatingly between the feeding means 20 and arraying/conveying means 30, while moving above and below the surfaces of the feeding means 20 and the arraying/conveying means 30.

In FIG. 4, a limit switch LS1 is adapted to detect the forks 117 reaching the backward stroke end, while limit switches LS2, LS3 and LS4 are adapted to detect the forks 117 reaching the forward stroke end. One of the limit switches LS2 to LS4 is selectively used in accordance with the width of the web-like work W.

Numerals 121 and 122 denotes kickers provided on the slide block 110 and adapted for contacting the limit switches LS1, LS2, LS3 and LS4.

Figure 6:
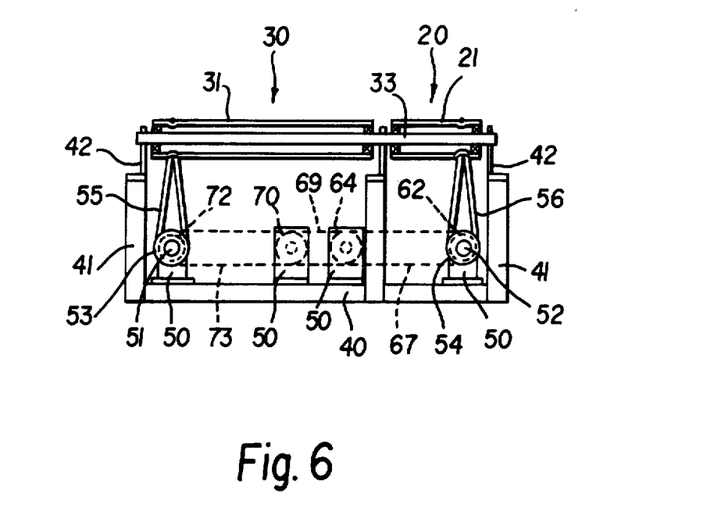
FIG. 6 is a partly-sectioned front elevational view of a feed roller conveyor and an arraying/conveying roller conveyor.
Figure 7:
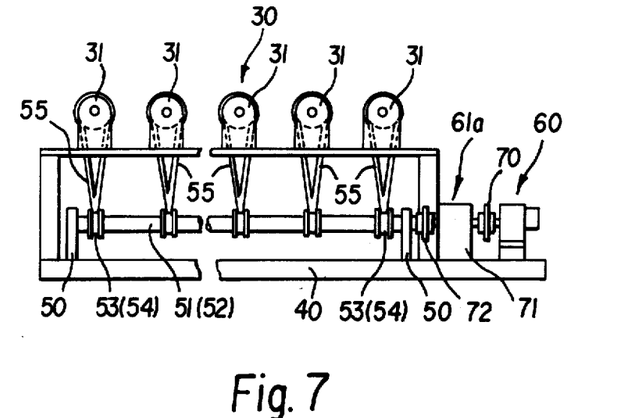
FIG. 7 is a side elevational view of the arrangement shown in FIG. 6.
Figure 8:
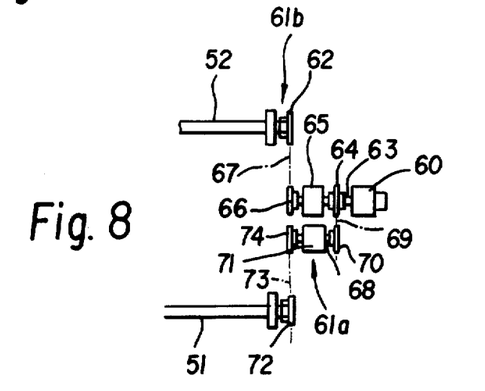
FIG. 8 is a plan view of a driving section for driving the feed roller conveyor and the arraying/conveying roller conveyor.

A description will be made hereinunder as to the construction of the feeding roller conveyor 20 constituting the feeding means 20 and the arraying/conveying roller conveyor 30 constituting the arraying/conveying means 30, with specific reference to FIGS. 6 to 8.

A plurality of rollers 21 of the feeding roller conveyor 20 and a plurality of rollers 31 of the arraying/conveying roller conveyor 30 are rotatably carried by common roller shafts 33 which are rotatably carried through brackets 42 by supporting posts 41 which in turn are supported by a common supporting frame 40.

The supporting frame 40 carries, through bearing members 50, a driving shaft 51 for the arraying/conveying roller conveyor 30 and the driving shaft 52 for the feeding roller conveyor 20. Endless driving belts 55 and 56 are extended around pulleys 53 and 54 fixed to the driving shafts 51 and 52 and the rollers 21 and 31. A driving motor 60 is mounted on one side of the supporting post 41 on the supporting frame 40. The driving motor 60 is drivingly connected to the driving shafts 51 and 52 through transmission mechanisms 61a and 61b.

The transmission mechanism 61b associated with the driving shaft 52 has a sprocket 62 fixed to one end of the driving shaft 52, a sprocket 64 fixed to the output shaft 63 of the driving motor 60, a clutch/brake device 65 and a sprocket 66, and a chain 67 going round the sprocket 66 and the sprocket 62. On the other hand, the transmission mechanism 61a associated with the driving shaft 51 includes a shaft 68 arranged in parallel with the output shaft 63 of the driving motor 60, a sprocket 70 on the shaft 63 and drivingly connected to the sprocket 64 through a chain 69, a clutch/brake device 71, a sprocket 74 which is connected through a chain 73 to a sprocket 72 secured to one end of the driving shaft 51.

The web-like blank extruded from an extruder (not shown) is cut into materials W of a predetermined size by a cutter provided in the extrusion line, and are transferred to the locating conveyor 10 successively at a suitable pitch which is determined by the speed of the conveyor leading to the locating conveyor 10.

In the locating conveyor 10, an arraying control is made such that the edges of the web-like works W become flush with one another. Namely, the locating conveyor 10 conveys the web-like works W such that one of the edges of these materials W are always aligned with the edges of the feeding roller conveyor 20 adjacent the arraying/conveying roller conveyor 30.

The detecting means K1 provided at the inlet side of the feeding roller conveyor 20 is adapted to stop the feeding roller conveyor 20 upon detection of the trailing end of the web-like work W, so that the web-like work W coming from the upstream side is stopped at a predetermined position on the roller conveyor 20.

On the other hand, the forks 117 on the shifting means 100 are disposed between adjacent rollers 21,31 of the feeding roller conveyor 20 and the arraying/conveying roller conveyor 30 and are designed to be movable between an upper stroke end and a lower stroke end such that, when the forks 117 are in the lower stroke end, the upper surfaces of the forks 117 are positioned below the upper surfaces of the rollers 21,31 so that the web-like works W can be conveyed on the feeding roller conveyor 20, whereas,when the forks 117 are in its upper stroke end, the web-like works can move between the lower surfaces of the forks 117 and the upper surface of the feeding roller conveyor 20. When the forks are in the backward stroke end, the ends of the forks 117 are located at the same positions as the edge of the arraying/conveying roller conveyor 30 adjacent to the feeding roller conveyor 20, whereas, when the forks 117 are in the forward stroke end, the ends of the forks 117 are located at a position which is spaced forwardly from the position taken by the same end when the forks are in the backward stroke end, by a distance equal to the pitch of array, i.e., the sum of the length of the web-like work W and the space between adjacent materials W.

The forward stroke end of the forks 117 is varied in accordancre with the size and the number of the web-like works.

A description will be made hereinunder as to how the web-like works W are arrayed and conveyed by the cooperation of the feeding roller conveyor 20, arraying/conveying roller conveyor 30 and the fork-type shifting means 100, on an assumption that there are four web-like works.

The forward stroke limit of the forks 117 is determined by selecting one of the limit switches LS2, LS3 and LS4 in accordance with the width or the number of the web-like works W. It is assumed here that the limit switch LS2 is used.

The arraying/convey of the web-like works is conducted in this state in the following procedure.

Figure 9:
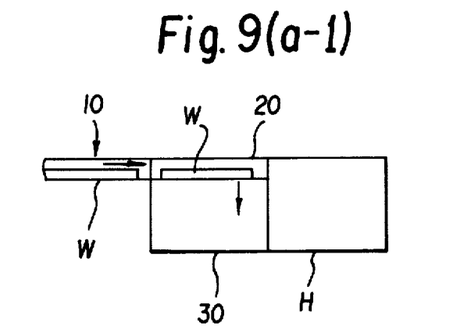
Figures 9, 9O:
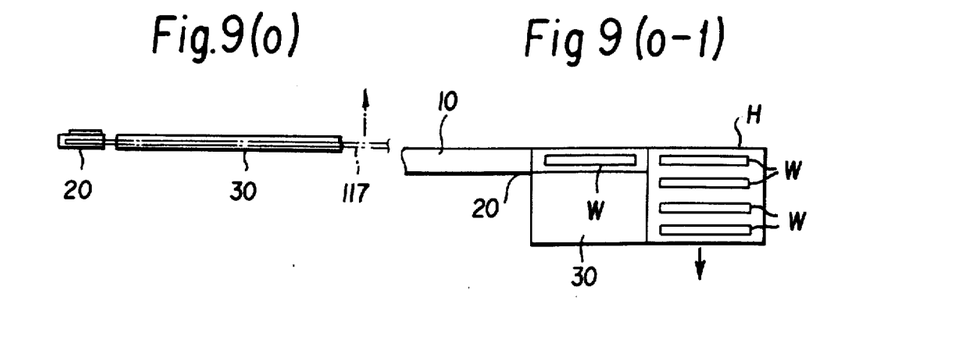
Figure 9A:
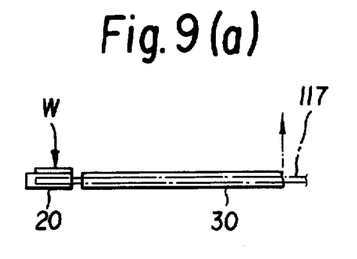
Figure 9B:
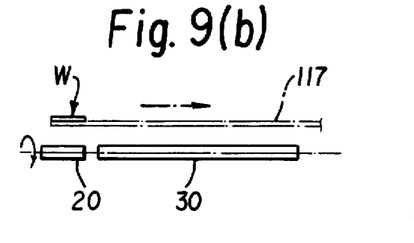
Figure 9C:
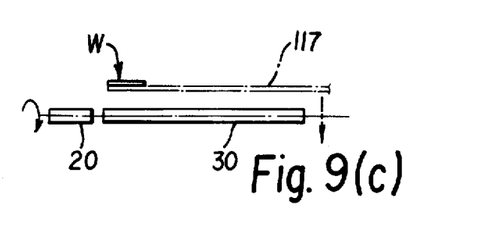
Figure 9D:
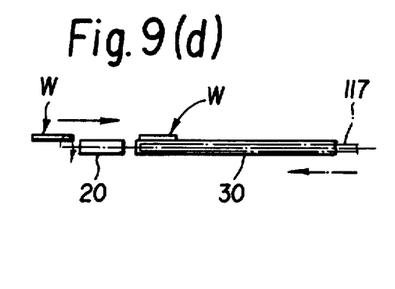
Figure 9E:
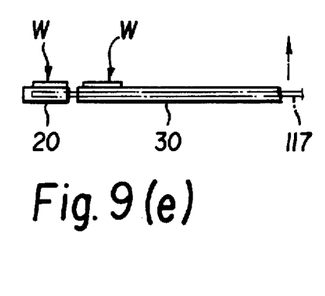
Figure 9F:
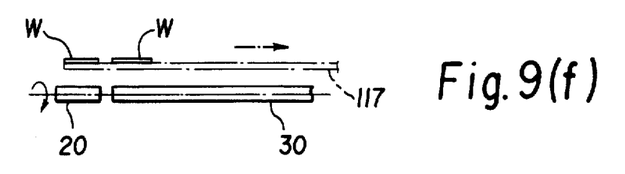
Figure 9G:
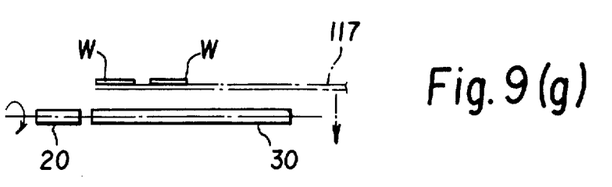
Figure 9H:
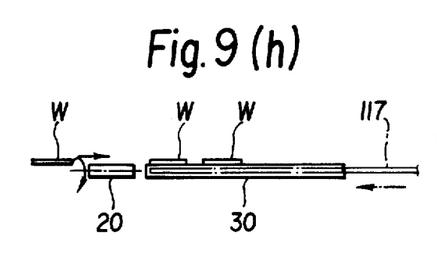
Figure 9I:
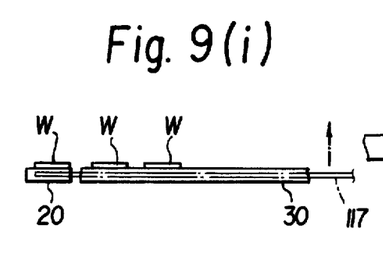
Figure 9J:
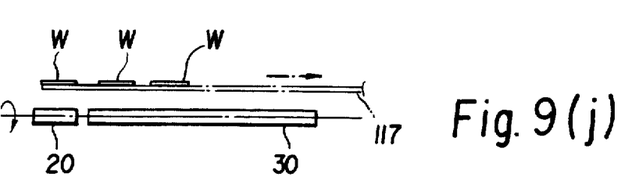
Figure 9K:
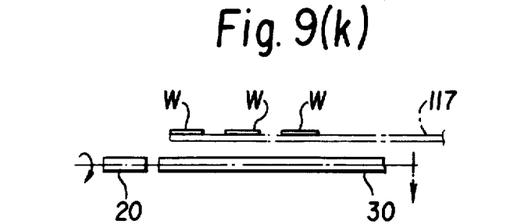

(1) The arrival of a first web-like work W conveyed by the locating conveyor 10 at the predetermined position on the feeding roller conveyor 20 is detected by the detecting means K1 and the feeding roller conveyor 20 is stopped. (FIGS. 9(a) and 9(a-1))

(2) Then, the lifting cylinder 114 of the shifting means 100 is contracted so that the forks 117 are raised to permit the latter receive the first web-like work W. When the forks 117 are fully raised, the feeding roller conveyor 20 is started to prepare for the feed of the next web-like work W into the feeding roller conveyor 20. (see FIG. 9(b))

(3) Subsequently, the driving motor 105 is driven forwardly so that the forks 117 are retracted to the position above the arraying/conveying roller conveyor 30. The forks 117 are then stopped by the operation of the limit switch LS1. (see FIG. 9(c))

(4) The lifting cylinder 114 is extended to lower the forks 117 so that the first web-like work W is transferred from the forks 117 to the arraying/conveying roller conveyor 30. (see FIGS. 9(d) and 9(d-1))

(5) Then, the driving motor 105 is reversed to drive the forks 117 forwardly and is stationed at the waiting position by the operation of the limit switch LS2. Meanwhile, the arrival of a second web-like work W at the predetermined position on the feeding roller conveyor 20 is detected by the detecting means K1 and the feeding roller conveyor 20 is stopped. (see FIG. 9(e) and 9(e-1))

(6) Then, the lifting cylinder 114 is contracted to raise the forks 117 so that the second web-like work W is held by the forks 117 together with the first work W. After the forks 117 are fully raised, the feeding roller conveyor 20 is started to prepare for the introduction of a third web-like work W onto the feeding roller conveyor 20. (see FIG. 9(f))

(7) Then, the driving motor 105 is rotated forwardly to move the forks 117 backward to a position above the arraying/conveying roller conveyor 30. Upon reaching the backward stroke end, the forks 117 are stopped by the operation of the limit switch LS1. (see FIG. 9(g))

(8) Then, the lifting cylinder 114 is extended so that the forks 117 are lowered, whereby the first and second web-like works W are delivered temporarily to the arraying/conveying roller conveyor 30. (see FIGS. 9(h) and 9(h-1))

(9) The driving motor 105 is reversed to drive the forks 117 forward until they are stopped at the forward stroke end by the operation of the limit switch LS2. Meanwhile, the arrival of the third web-like work W at the predetermined position on the feeding roller conveyor 20 is detected by the detecting means K1 which then operates to stop the feeding roller conveyor 20. (see FIGS. 9(i) and 9(i-1))

(10) Then, as explained before, the lifting cylinder 114 is contracted to raise the forks 117 so that the forks 117 receive the third web-like work W together with the first and second works. AFter the forks 117 have been fully raised, the feeding roller conveyor 20 is started to prepare for the introduction of a fourth web-like work W. (see FIG. 9(j))

(11) Then, the driving motor 105 is operated forwardly so that the forks 117 are moved backward to the position above the arraying/conveying roller conveyor 30, by the operation of the limit switch LS1. (see FIG. 9(k))

(12) Then, the lifting cylinder 114 is extended to lower the forks 117 so that three web-like works W on the forks 117 are temporarily delivered to the arraying-/conveying roller conveyor 30. (see FIGS. 9(l) and 9(l-1))

(13) The driving motor 105 is then reversed to drive the forks 117 forwardly until they are stopped at the forward stroke end by the operation of the limit switch LS2. Meanwhile, the arrival of the fourth web-like work W at the predetermined position on the feeding roller conveyor 20 is detected by the detecting means K1 which then operates to stop the feeding roller conveyor 20. (see FIGS. 9(m) and 9(m-10)

(14) In this state, the feeding roller conveyor 20, arraying/conveying roller conveyor 30 and the receiving conveyor H are driven simultaneously, so that four web-like works W arrayed on the feeding roller conveyor 20 and the arraying/conveying roller conveyor 30 are shifted to the receiving conveyor H. (see FIGS. 9(n) and 9(n-1))

(15) Then, after completion of the shift of four web-like works W onto the receiving conveyor H, the operation of the feeding roller conveyor 30 and the receiving conveyor H is stopped. (see FIGS. 9(o) and 9(o-1))

(16) Finally, four web-like works W forming an array on the receiving conveyor H are transferred to the storage pallet G by means of the shifting belt conveyor 200, thus completing the arraying/convey of the web-like works W.

The described steps (1) to (16) of the process are conducted cyclically for the successive batches of the web-like works W.

As has been described, the present invention provides an apparatus for arraying/conveying web-like works comprising: a feeding means for feeding web-like works cut in a predetermined size; an arraying/conveying means disposed in the vicinity of the feeding means; and shifting means disposed between the feeding means and the arraying/conveying means and having a fork movable up and down and forward and backward such as to shift the web-like works from the feeding means to the arraying/conveying means at a predetermined pitch.

According to this arrangement, the undesirable oblique running or turning of the web-like works during the arraying and transfer of the web-like works is effectively avoided only by taking a suitable countermeasure for preventing any slip between the forks and the web-like works. In addition, the pitch of array of the web-like works can be adjusted to permit an increase in the number of the web-like works which can be held on the pallet, thereby improving the work storage efficiency of the apparatus.

What is claimed is:

1. An apparatus for conveying and arraying elongated workpieces, said apparatus comprising first conveyor means for sequentially receiving and conveying said workpieces, second conveyor means for sequentially receiving and supporting said workpieces from said first conveyor means and thereafter for conveying said workpieces, said first and second conveyor means being adapted to convey said workpieces in a common direction and transporting means for sequentially lifting said workpieces from said first conveyor means, transporting said workpieces to said second conveyor means and sequentially placing and positioning said workpieces in selective, spaced-apart relation on said second conveyor means to form a workpiece array on said first and second conveyor means, and means for simultaneous operation of said first and second conveyors to convey said array.

2. The apparatus of claim 1 wherein said first and second conveyor means convey said array to a workpiece receiving means.

3. The apparatus of claim 2 wherein said workpiece receiving means is a third conveyor.

4. The apparatus of claim 2 wherein said first and second conveyor means includes a plurality of rollers horizontally axially positioned in substantially the same plane to form a workpiece conveying surface.

5. The apparatus of claim 4 wherein said transporting means includes a plurality of forks adapted for substantially vertical movement between said rollers of said first and second conveyor means from a first position beneath said workpiece conveying surface of said rollers to a second position above said rollers, for substantially horizontal movement from said second position to a third position away from said first conveyor means and towards and above said second conveyor means and for movement to a third position beneath said workpiece conveying surface.

* * * * *